United States Patent
Klotz et al.

(10) Patent No.: US 8,096,218 B2
(45) Date of Patent: Jan. 17, 2012

(54) DEVICE FOR MINCING FOOD

(75) Inventors: Markus Klotz, Hainau (DE); Benjamin Schramm, Holzheim (DE)

(73) Assignee: Leifheit AG, Nassau/Lahn (DE)

( * ) Notice: Subject to any disclaimer, the term of this patent is extended or adjusted under 35 U.S.C. 154(b) by 40 days.

(21) Appl. No.: 11/100,092

(22) Filed: Apr. 6, 2005

(65) Prior Publication Data

US 2006/0261196 A1 Nov. 23, 2006

Related U.S. Application Data

(60) Provisional application No. 60/646,926, filed on Jan. 25, 2005.

(30) Foreign Application Priority Data

| Apr. 6, 2004 | (DE) | 10 2004 017 334 |
| Nov. 23, 2004 | (DE) | 10 2004 056 405 |
| Jan. 17, 2005 | (DE) | 10 2005 002 329 |
| Feb. 8, 2005 | (DE) | 10 2005 005 821 |

(51) Int. Cl.
*B02C 18/18* (2006.01)
*B26D 3/28* (2006.01)
*B26D 3/00* (2006.01)

(52) U.S. Cl. ........ 83/352; 83/436.2; 83/599.15; 83/719; 83/DIG. 1; 241/95

(58) Field of Classification Search ............ 83/717–720, 83/406.1, 703, DIG. 1, 49, 856, 435.15, 437.7, 83/397–400, 857, 865, 715, 404.3, 61, 63, 83/74, 368, 352, 372, 435.1, 436.2, 437.2, 83/582, 588, 564, 678, 730, 699.51, 932, 83/955; 241/168–169, DIG. 17, 94–95, 273.1–273.4, 241/100, 101.1; D7/673, 693, 678; 983/717–720, 983/730; 99/537; 30/279.2, 279.4, 279.6, 30/502, 283, 121.5; 220/262–264
See application file for complete search history.

(56) References Cited

U.S. PATENT DOCUMENTS

| 190,875 | A | * | 5/1877 | Kuchinka | 30/278 |
| 447,655 | A | * | 3/1891 | Bew | 241/95 |
| 557,914 | A | * | 4/1896 | Struble et al. | 76/104.1 |
| 1,296,091 | A | | 3/1919 | Kriebel | |
| 2,108,972 | A | * | 2/1938 | Orner | 83/122 |

(Continued)

FOREIGN PATENT DOCUMENTS

DE 663782 8/1938

(Continued)

OTHER PUBLICATIONS

U.S. Design Application No. 29/252919, filed Jan. 30, 2006.

*Primary Examiner* — Laura M. Lee
(74) *Attorney, Agent, or Firm* — Leydig, Voit & Mayer, Ltd.

(57) ABSTRACT

A device for cutting food includes a slide operable to receive a food product that is slid across the slide so as to perform a cutting procedure. A cutting blade including a cutting edge is included. A switch is included operable to switch the device from a neutral position in which the cutting edge is at least one of covered and recessed, to a cutting position in which the cutting edge is neither covered nor recessed.

18 Claims, 11 Drawing Sheets

U.S. PATENT DOCUMENTS

| | | | | |
|---|---|---|---|---|
| 2,766,793 | A | * | 10/1956 | Duszynski ............... 83/699.51 |
| 2,786,503 | A | * | 3/1957 | Lewis ............................ 83/857 |
| 2,807,302 | A | | 9/1957 | Qualheim |
| 2,895,520 | A | * | 7/1959 | Morris .......................... 83/156 |
| 3,779,115 | A | * | 12/1973 | Talbert ......................... 83/210 |
| 4,546,684 | A | | 10/1985 | Bellerose |
| 4,570,519 | A | * | 2/1986 | Motosko, II ................. 83/856 |
| 5,042,346 | A | * | 8/1991 | McCann ....................... 83/421 |
| 5,308,002 | A | | 5/1994 | Pereira |
| 5,918,522 | A | * | 7/1999 | Benedict et al. ............. 83/478 |
| 5,937,720 | A | * | 8/1999 | Itzov ............................ 83/397 |
| 6,080,041 | A | | 6/2000 | Greenland ..................... 451/11 |
| 6,082,645 | A | | 7/2000 | Himmighofen et al. |
| 6,412,717 | B1 | | 7/2002 | Menelaou et al. |
| 6,585,179 | B2 | * | 7/2003 | Weibel et al. ................ 241/169 |
| 2006/0157599 | A1 | | 7/2006 | Klotz et al. |
| 2006/0231652 | A1 | | 10/2006 | Menze |

FOREIGN PATENT DOCUMENTS

| | | |
|---|---|---|
| DE | 844651 | 7/1952 |
| DE | 28 16 929 | 10/1979 |
| DE | 28 57 743 | 12/1982 |
| DE | 9201765 | 4/1992 |
| DE | 10305969 | 8/2004 |
| EP | 0965418 | 12/1999 |
| FR | 597349 | 11/1925 |
| GB | 2032260 | 5/1980 |
| GB | 1599694 | 10/1981 |
| GB | 2313771 | 12/1997 |

* cited by examiner

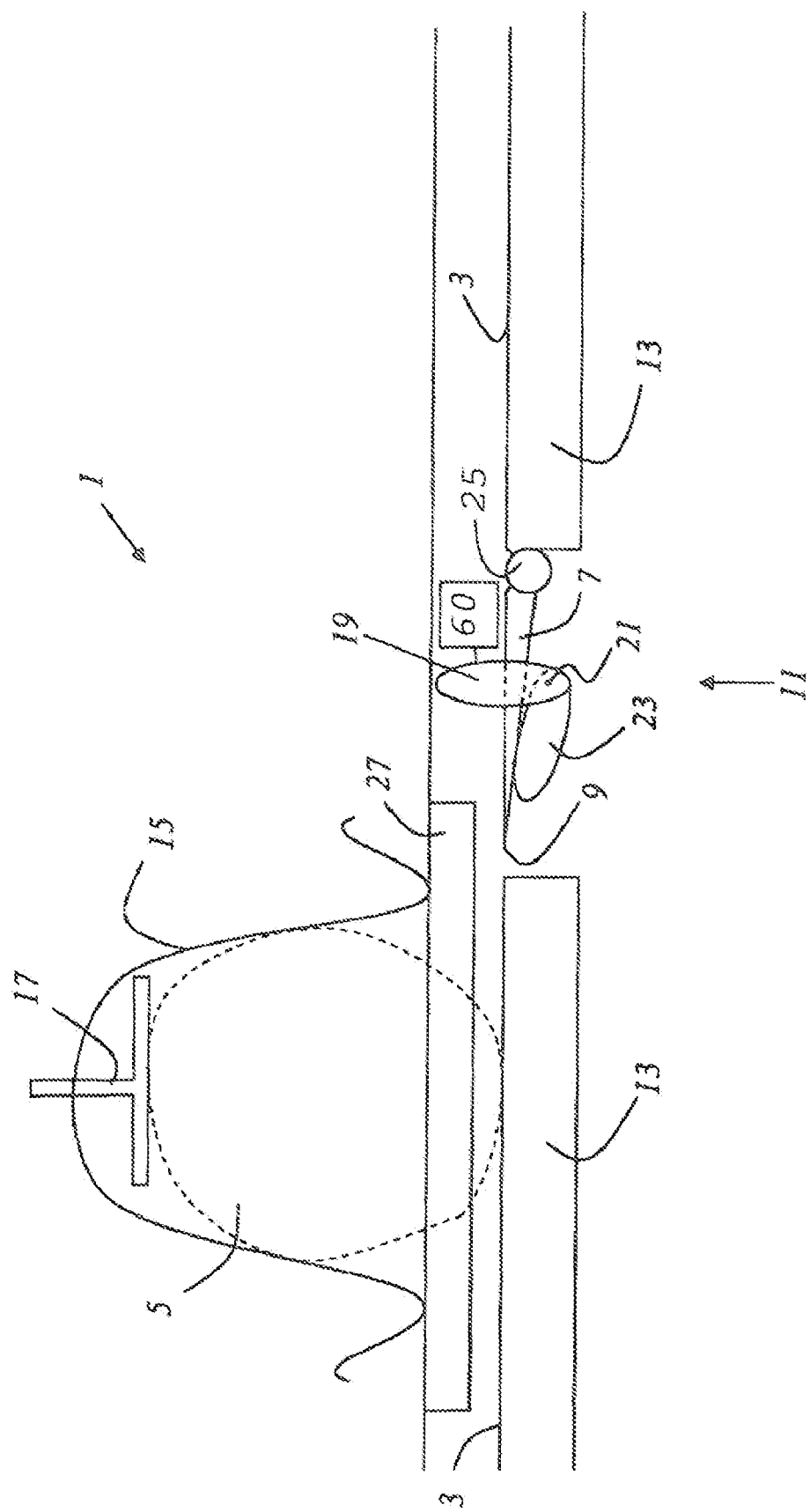

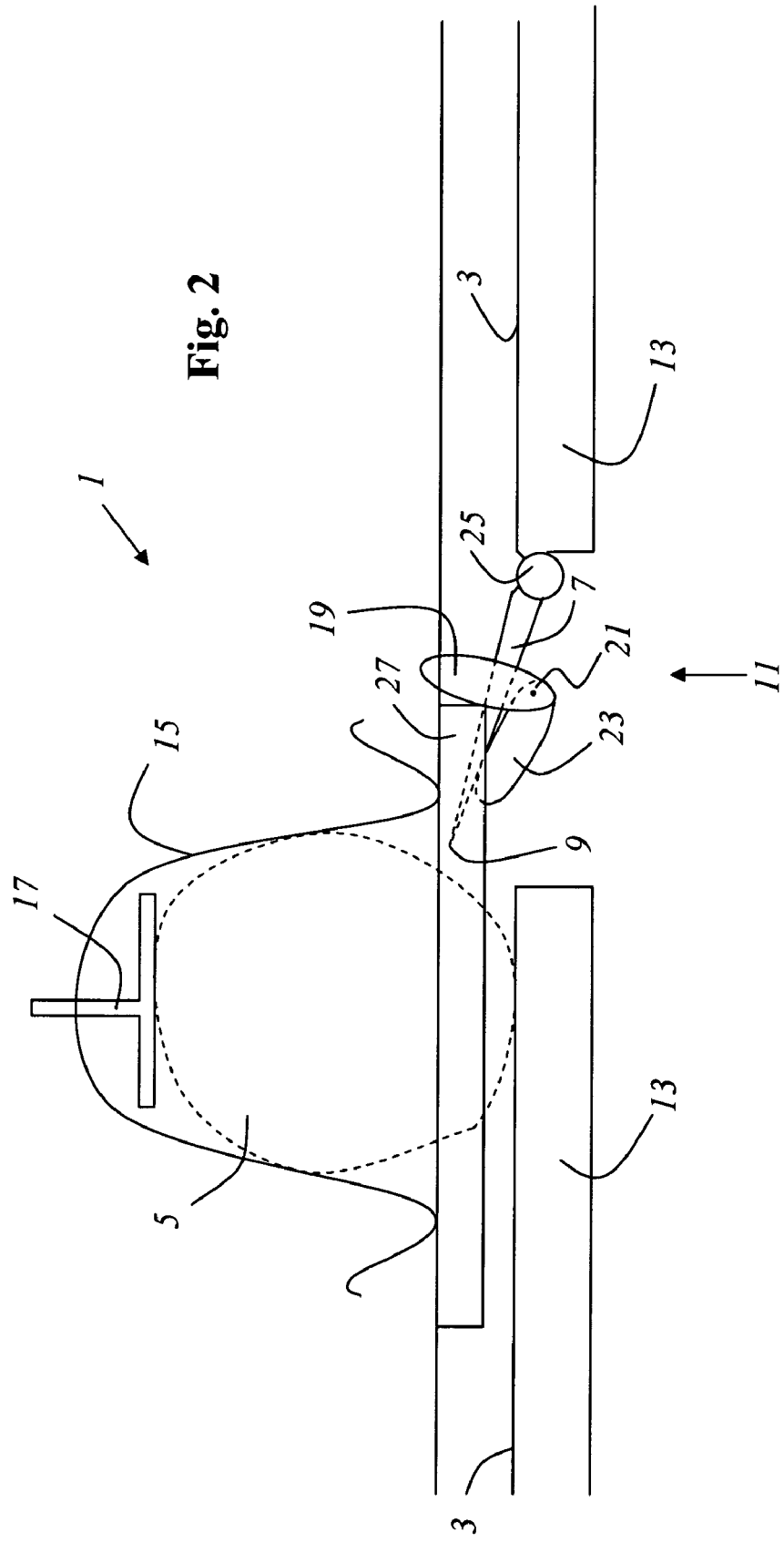

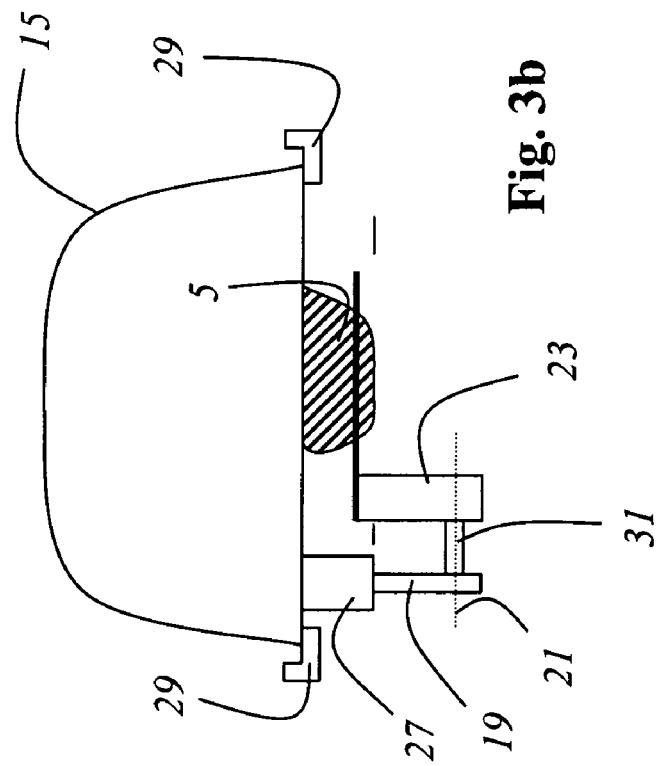
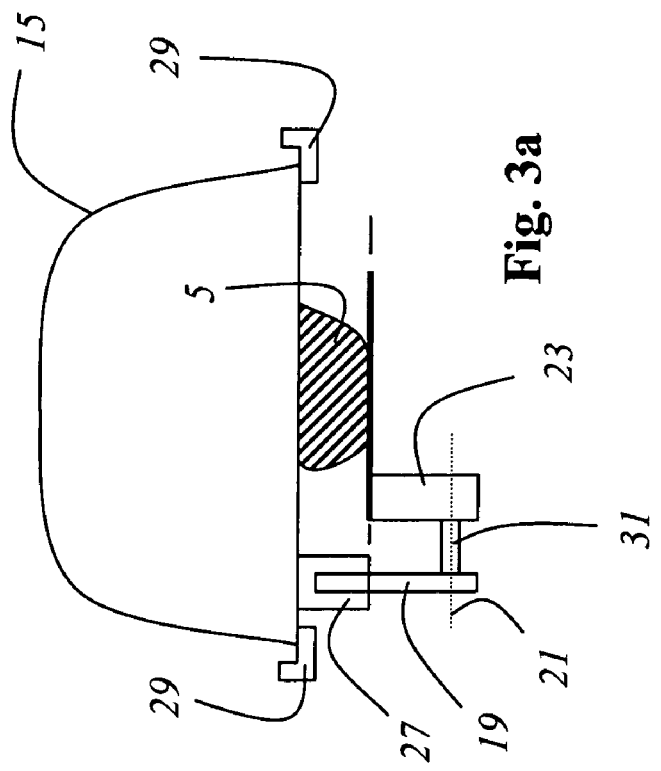

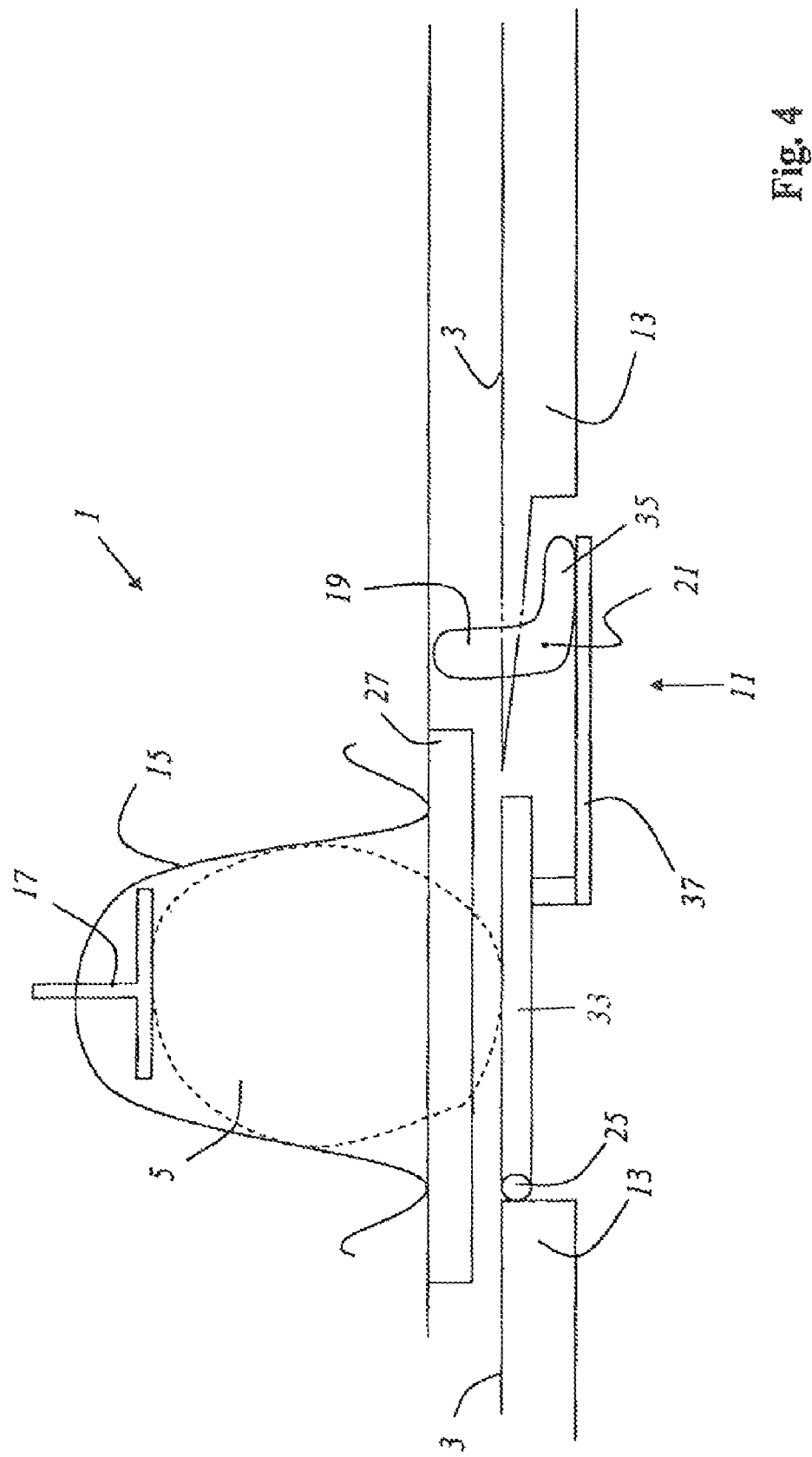

DEVICE FOR MINCING FOOD

BACKGROUND

The invention relates to a device for mincing food, having a slide on which a food product that is to be minced can be slid so as to carry out a mincing procedure, and having at least one cutting blade.

DE 28 16 929 describes a device for mincing food, consisting of an elongated baseplate provided with a handle, whereby the food product to be minced can be moved back and forth by hand over the surface of said baseplate. In the middle section, the device has a replaceable mincing plate.

Most of the very sharp blades of the devices known from the state of the art for mincing food can cause injury during use as well as during careless storage, for example, in an untidy kitchen drawer. The use of food remnant holders as is known, for example, from DE 28 57 743, at best provides protection against injury during use; moreover, this is only effective if the mincing device and the food remnant holder are handled properly.

SUMMARY

Therefore, there is a need for a device for mincing food that is quite safe during use as well as during storage.

The invention provides a device for cutting food that includes a slide on which food product that is to be cut is slid during an operation of the device and at least one cutting blade to cut the food. The device also includes a switch that switches over between a neutral position, in which at least the cutting edge of the cutting blade is covered and/or recessed, and a cutting position, in which the cutting edge of the cutting blade is not covered and not recessed, that is, exposed.

BRIEF DESCRIPTION OF THE DRAWINGS

Exemplary embodiments of the invention are schematically depicted in the drawings and described with reference thereto, elements with the same function being provided with the same reference numerals. The following are shown:

FIG. 1 a device according to one embodiment of the invention for mincing food, in the neutral position, FIG. 2 the device according to the embodiment shown in FIG. 1, in the cutting position, FIG. 3a a sectional view of the device according to the embodiment of FIG. 1, in the neutral position, FIG. 3b a sectional view of the device according to the embodiment of FIG. 1, in the cutting position, FIG. 4 a device according to another embodiment of the invention for mincing food, in the neutral position, FIG. 5 the device according to the embodiment shown in FIG. 4, in the cutting position, FIG. 6 a device according to another embodiment of the invention, FIG. 7 a replaceable blade module for a device for mincing food, in the neutral position, FIG. 8 the replaceable blade module of FIG. 7, in the cutting position, FIG. 9 the replaceable blade module of FIG. 7, in a view from below, FIG. 10 another replaceable blade module for a device for mincing food, in a view from below, FIG. 11 a device according to another embodiment of the invention.

DETAILED DESCRIPTION

Figure 5:
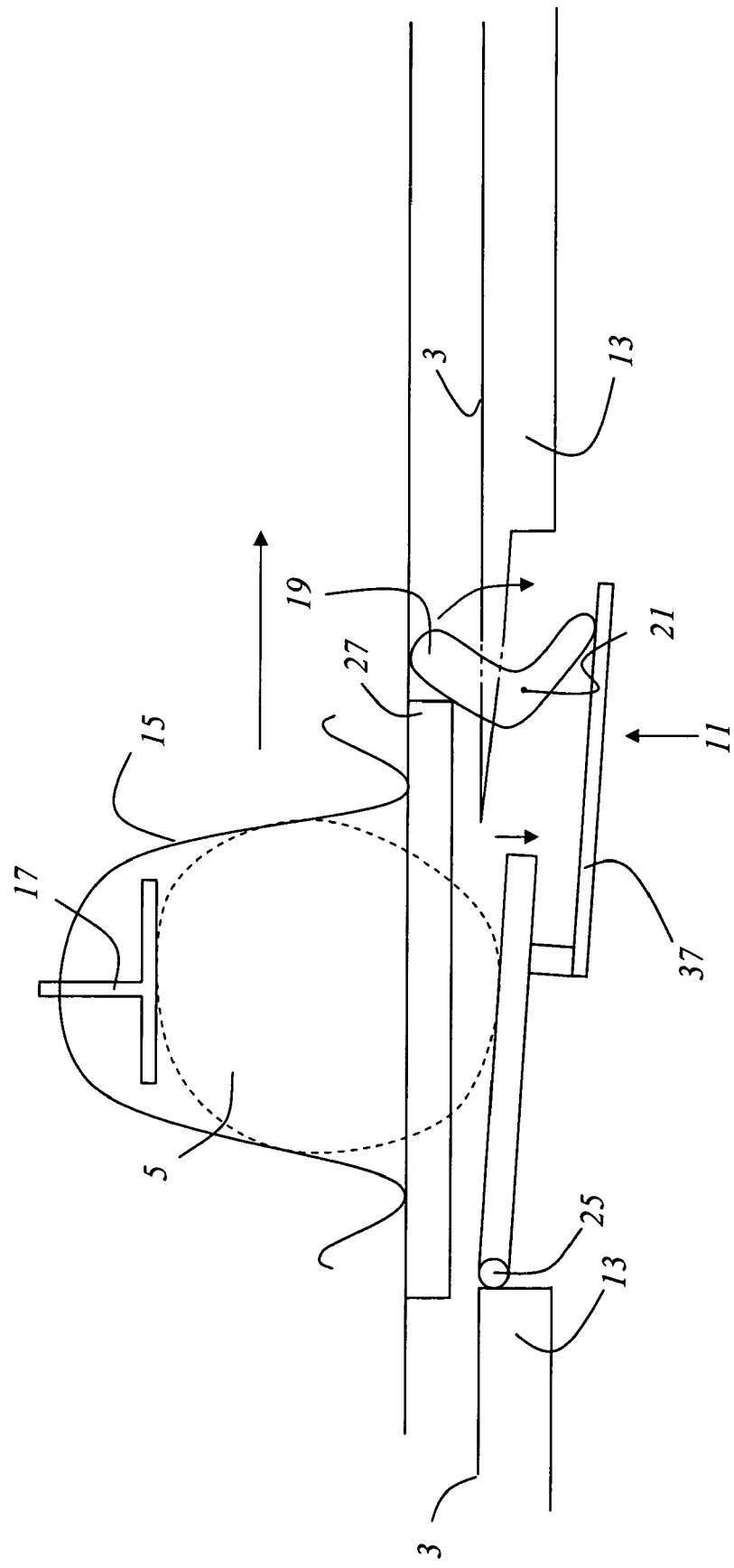

The device according to the invention has the advantage that the cutting edge(s) of the cutting blade(s) can be brought from a safe neutral position into the cutting position only immediately before the actual cutting procedure—that is to say, only shortly before the food product to be cut reaches the cutting blade—and said cutting blade(s) may disappear into the safe neutral position again, immediately after the cutting procedure. When the device is not being used, it can be stowed and put away without any further safety precautions. Injury on the cutting blades of the device is avoided when a person is rummaging through an untidy kitchen drawer. During use as well, the risk of injury is greatly minimized since the cutting edge is either in the safe neutral position or—during the actual cutting procedure—is at least partially covered by the food product being cut.

In one embodiment, the switch can be actuated by the food product to be cut and/or by a holder that grips the food product to be cut. For this purpose, the switch can comprise, for example, a lever (e.g. switch-over lever) that is then automatically actuated by the food product to be cut and/or by a holder for the food product to be cut.

The slide may have at least one guide for the food product to be cut and/or for the holder of the food product to be cut, said guide permitting a back-and-forth movement on the slide but preventing the food product or the holder from sliding off sideways. Further, the holder can be latched in the guide as it comes from a direction perpendicular to the plane of the slide. For this purpose, a latching mechanism or a snap-action mechanism, for example, can be provided.

The switch may switch over from the neutral position into the cutting position when the food product to be cut and/or the holder of the food product to be cut comes within a predefined distance from the cutting blade. In one embodiment, it is provided that the switch switches over from the neutral position into the cutting position when the food product to be cut and/or the holder of the food product to be cut reaches a predefined position on the slide.

The switch can switch over from the cutting position back into the neutral position once the actual cutting procedure has been completed. The switch may optionally be configured in such a way that the cutting blade or the cutting edge remains in the neutral position when the food product to be cut and/or the holder is moving back. This allows a virtually jolt-free and pleasant back-and-forth movement. A possible configuration can be that the switch-over lever has a ratchet function so that, when pressure is exerted from one side (forward movement), it latches and moves a rotary shaft that is mechanically coupled to the cutting blade, while no force is transmitted to the rotary shaft due to freewheeling when pressure is exerted from the other side (return movement).

Optionally, the switch switches over from the cutting position into the neutral position when the food product to be cut and/or the holder of the food product to be cut goes beyond another predefined distance from the cutting blade. In one embodiment, the switch switches over from the cutting position into the neutral position when the food product to be cut and/or the holder of the food product to be cut reaches another predefined position on the slide.

In one particular embodiment, the switch switches over as a function of the direction of movement of the food product to be cut and/or of the holder of the food product to be cut, optionally only during the forward movement in which cutting occurs, and not during the return movement.

The at least one cutting blade may be arranged movably relative to the slide. In this embodiment, the cutting blade is mechanically regulated in order to achieve a switching over between the neutral position and the cutting position. For this purpose, the slide or parts of the slide—instead of the cutting blade—can also be configured and regulated so as to be movable. In a particular embodiment, the switch moves a movable feed lip—preferably configured as an integral part of the slide—in order to switch over between the neutral position and the cutting position.

Optionally, the slide is arranged on a baseplate, whereby in the neutral position, at least the cutting edge of the cutting blade is covered by the baseplate and/or recessed into it. In this position, users can safely run their fingers over the entire slide without being injured.

In one embodiment of the invention, the cutting edge of the cutting blade in the neutral position is situated at the level of the surface (for example, the plane) in which the slide lies. Additionally, the cutting edge of the cutting blade in the cutting position may be situated outside of the surface (for example, the plane) in which the slide lies.

In order to adjust the cutting thickness, the relative distance between the cutting edge and the slide—relative to the cutting position—may be adjustable.

The switch can optionally comprise a switch-over lever that projects at least partially out of the slide and/or out of the guide of the slide, for example, so that the food product that is slid over the slide and/or the holder flips the switch-over lever during the sliding procedure.

In one embodiment, the switch has a gear that transmits the for switching over between the neutral position and the cutting position.

Optionally, a spring means is provided that holds the cutting blade in the neutral position. In this embodiment, the switch acts against the spring force when it switches over from the neutral position into the cutting position. The switching over from the cutting position into the neutral position can be effectuated by the spring means after the mechanical release.

In one embodiment, the cutting edge of the cutting blade in the cutting position is arranged parallel to the slide. This embodiment serves, for example, to cut slices or to make strips julienne) or cubes after one or more alligator cuts.

In another embodiment, the cutting edge of the cutting blade in the cutting position is arranged at an angle—for example perpendicular—relative to the plane of the slide that differs from 0 degrees. This embodiment can be configured as an alligator blade.

The cutting blade can be configured as a V-shaped blade and/or as an undulated blade and/or as a blade bundle and/or as a cutting comb of alligator blades.

In a particular embodiment, at least one additional cutting blade is provided. This can be configured, for example, as a V-shaped blade and/or as an undulated blade and/or as a blade bundle. The additional blade might be designed as an alligator blade—for example, for making strips julienne) or cubes. For this purpose, the at least one additional blade is configured as a blade bundle, possibly standing perpendicular to the slide.

In one embodiment, the switch also switches the at least one additional cutting blade between a neutral position, in which at least the additional cutting edge of the additional cutting blade is covered and/or recessed, and a cutting position, in which the additional cutting edge of the additional cutting blade is not covered and/or recessed.

However, the at least one additional cutting blade can also be arranged immovably relative to the slide.

Optionally, the at least one cutting blade and/or the at least one additional cutting blade is configured as an integral part of a replaceable blade module. This has the advantage that the user—as a function of the intended use—can choose between differently configured blade modules. Moreover, it is not necessary to replace the entire device when a cutting blade is worn out.

In one embodiment, the switch is at least partially an integral part of the replaceable blade module.

In one particular embodiment, a rotator is provided for rotating the food product to be cut and/or at least part of a holder of a food product to be cut. The rotator may function automatically. It can be configured in such a way that the rotator adjusts the rotating position as a function of the position—relative to the slide—of the food product to be cut and/or of the holder of the food product to be cut. Optionally the rotator rotates a food product to be minced in 90 degree increments around a rotational axis that is perpendicular to the slide. For example, a clockwise rotation can be made during the forward movement, and a counterclockwise rotation can be made during the return movement—or else vice versa.

In one embodiment, the device for mincing food is configured as a grater, such as a dicer and/or as a slicer. With the dicer, the food product to be minced may be first passed over a comb of alligator blades, then rotated by 90 degrees around a rotational axis that is perpendicular to the slide, passed once again over a comb of alligator blades—possibly the same ones—and finally cut with a cutting blade arranged parallel to the slide. Optionally, the switch only moves the cutting blade from a neutral position into a cutting position immediately before the last phase (cutting step).

FIG. 1 shows a device 1 according to the invention for mincing food, having a slide 3, on which the food product 5 to be minced can be slid so as to carry out a mincing procedure, and having a cutting blade 7 with a cutting edge 9. The device 1 for mincing food has a switch 11 that switches over between a neutral position, in which at least the cutting edge 9 of the cutting blade is in the plane of the slide 3 and is consequently covered by the baseplate 13 that supports the slide 3, and a cutting position, in which the cutting edge 9 of the cutting blade is not covered and not recessed. The neutral position is shown in the figure. The user can employ a holder 15 to slide the food product 5 that is to be minced back and forth on the slide. The holder 15 has a spring-loaded pusher 17 that presses the food product 5 to be minced onto the slide 3. A rail 27 is arranged on the holder 15 and it can be moved together with the holder 15 in a guide groove. The switch 11 has a switch-over lever 19 that is mounted so as to rotate around a rotational axis 21. The switch-over lever 19—as seen from above—is arranged laterally next to the cutting blade 7. Relative to the viewing angle of the figure, the cutting blade 7 is situated behind the switch-over lever 19. A cam 23 is arranged below the cutting blade 7 and it, too, can be rotated around the rotational axis 21. The cam 23 is mechanically coupled to the switch-over lever in such a way that the latter pushes the cutting blade 7—which is mounted so that it can be tilted by the hinge 25—upwards into the cutting position as the switch-over lever 19 is being moved by the rail 27 when the holder 15 is moved from left to right. The cutting position thus reached is shown in FIG. 2. During the actual cutting procedure, the rail 27 pushes the switch-over lever 19 downwards against the force of a spring 60 and thus—via the cam 23—pushes the cutting blade 7 upwards into the cutting position. After the user has moved the holder 15 completely over the cutting blade 7, the switch-over lever is automatically released and the cutting blade is pushed into the neutral position by the force of the spring.

The switch 11 switches over from the neutral position into the cutting position when the holder 15 of the food product 5 to be cut comes within a predefined distance from the cutting blade. Analogously, the switch 11 switches over from the cutting position back into the neutral position when the holder 15 of the food product 5 to be cut goes beyond another predefined distance from the cutting blade 7. In the device 1 shown, the distance and the additional distance are determined by the length of the rail 27 and by its position relative to the holder 15.

FIG. 3a shows a front sectional view of the device according to the invention depicted in FIG. 1 for mincing food, in the neutral position. It can be seen that the cutting edge 9 in the neutral position is at the level of the slide 3. The holder 15 runs in lateral guide elements 29.

FIG. 3b shows a front sectional view of the device according to the invention depicted in FIG. 1 for mincing food, in the cutting position. In this cutting position, the rail 27 pushes the switch-over lever 19 downwards and thus pushes the cutting edge 9 upwards via the rotational shaft 31 and the cam 23, which all rotate together around the rotational axis 21.

FIG. 4 shows another embodiment of the invention for mincing food, in the neutral position. In this embodiment, the switch 11 for switching over between the neutral position and the cutting position moves a movable feed lip 33—optionally configured as an integral part of the slide—that can be tilted relative to the slide by the hinge 25. In this embodiment, the switch-over means, as a switch-over lever 19, has an angled lever 35 which, via a support 37 that is firmly attached to the feed lip 33, presses said feed lip 33 downwards against the spring force when the switch-over lever 19 is flipped by the rail 27 of the holder 15. When the feed lip 33 is pressed down, the covering of the cutting edge 9 is temporarily removed by the feed lip 33, the cutting edge 9 is exposed and the cutting position is reached (see FIG. 5). Once the user has moved the holder 15 completely over the cutting blade 7, the switch-over lever is automatically released and the cutting blade is pressed into the neutral position by the spring. In the embodiment shown, the hinge 25 is produced as a film hinge in one piece together with the slide and the baseplate and thus, by nature, it has a spring effect that pushes the feed lip 33 into the neutral position.

Figure 6:
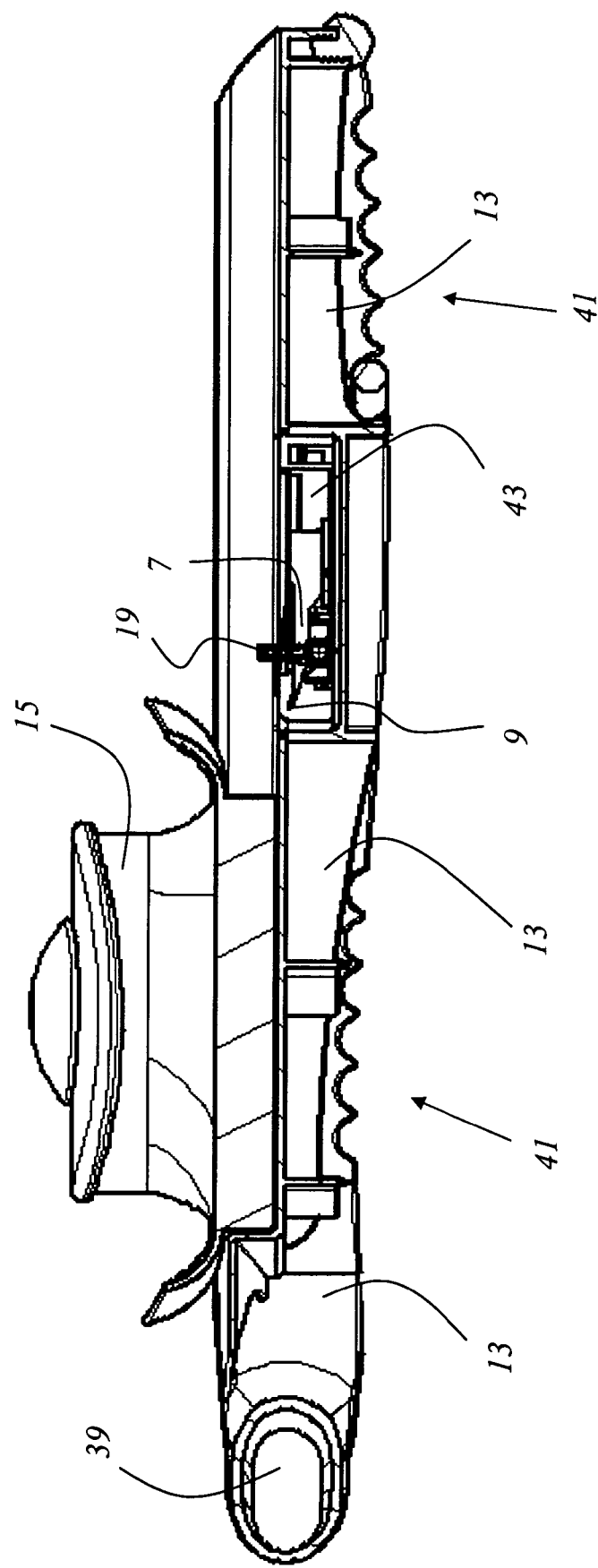

FIG. 6 shows another embodiment of device 1, in the neutral position. The device 1 has a cutting blade 7 with a cutting edge 9 and a switch 11 with a switch-over lever 19. The device 1 is provided with a handle 39 and with ridges 41 so that the device can be placed onto a container without slipping off. The cutting blade 7 and the switch 11 are configured as a replaceable blade module 43.

Figure 7:
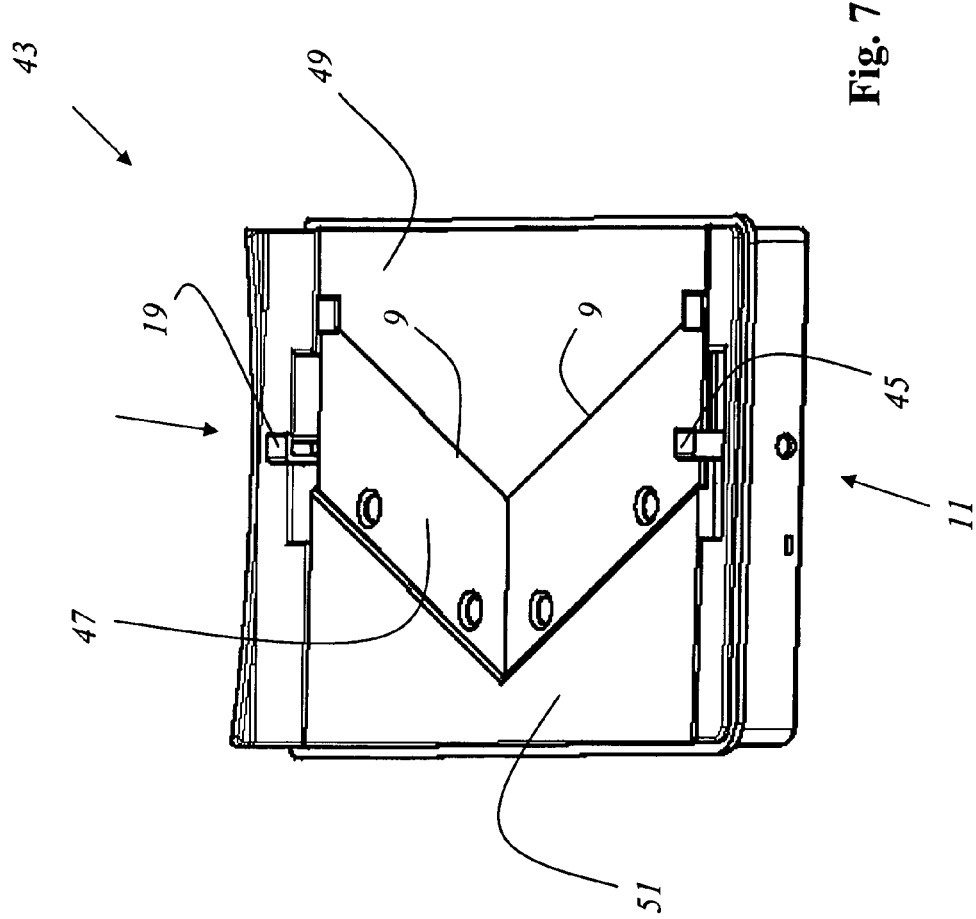

FIG. 7 shows a replaceable blade module 43 for a device 1 for mincing food, in the neutral position. The blade module 43 comprises a switch 11 with a switch-over lever 19 and an additional switch-over lever 45 as well as a cutting blade 7 configured as a V-shaped blade 47. The replaceable blade module 43 has slide connection elements 49, 51 that cover the cutting edge 9 in the neutral position shown.

Figure 8:
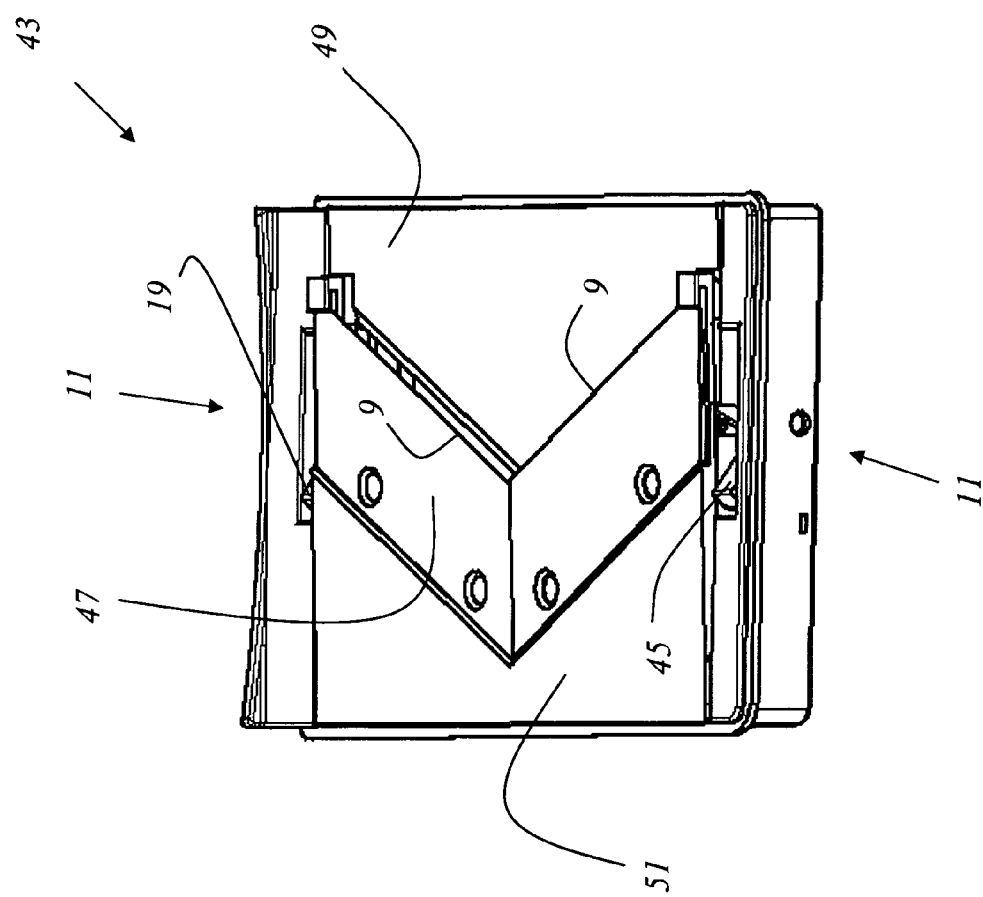

FIG. 8 shows the replaceable blade module 43 described with reference to FIG. 6, in the cutting position. It can be seen that, by flipping the switch-over lever 19 and the additional switch-over lever 45, the cutting edge 9 is raised out of the plane of the slide connection elements 49, 51 into the cutting position.

Figure 9:
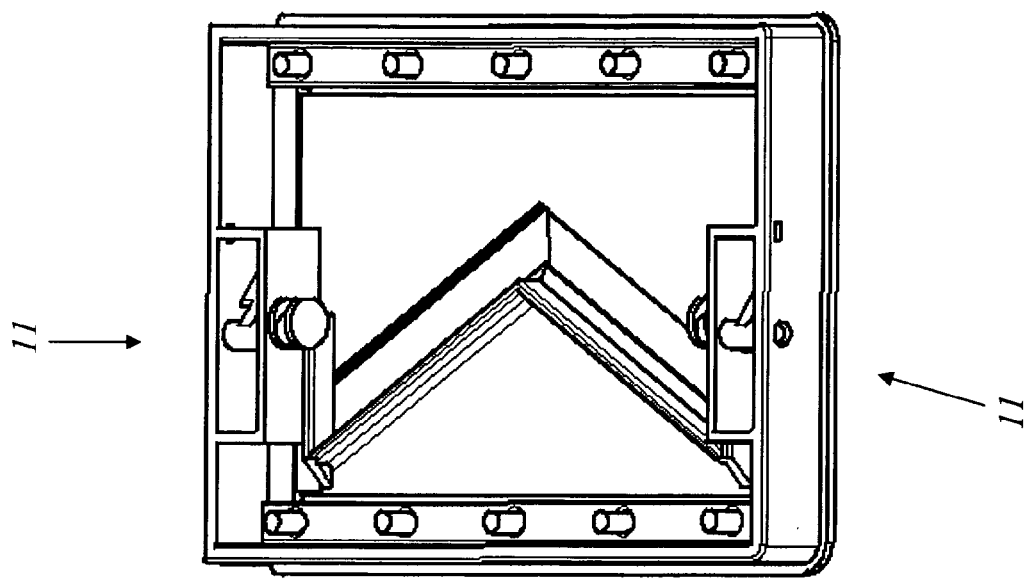
Figure 10:
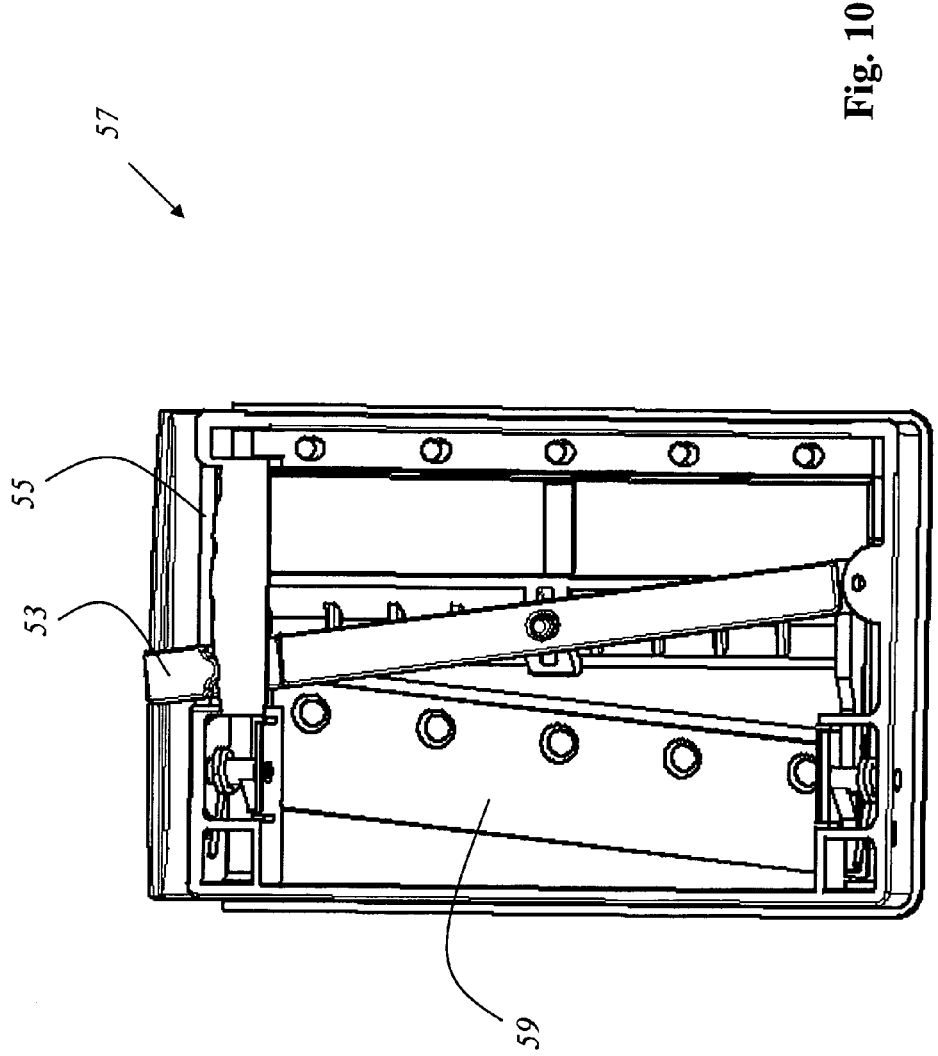

FIG. 9 shows the replaceable blade module 43 with the switch 11, in a view from below. FIG. 10 shows another blade module 57 with a cutting blade 7 configured as an elongated blade 59, in a view from below. The additional blade module 57 has an for adjusting the cutting thickness. The adjustment lever 53, which lies on a contact slope 55 against spring force, can be used to adjust the relative distance between the cutting edge and the slide—relative to the cutting position.

Figure 11:
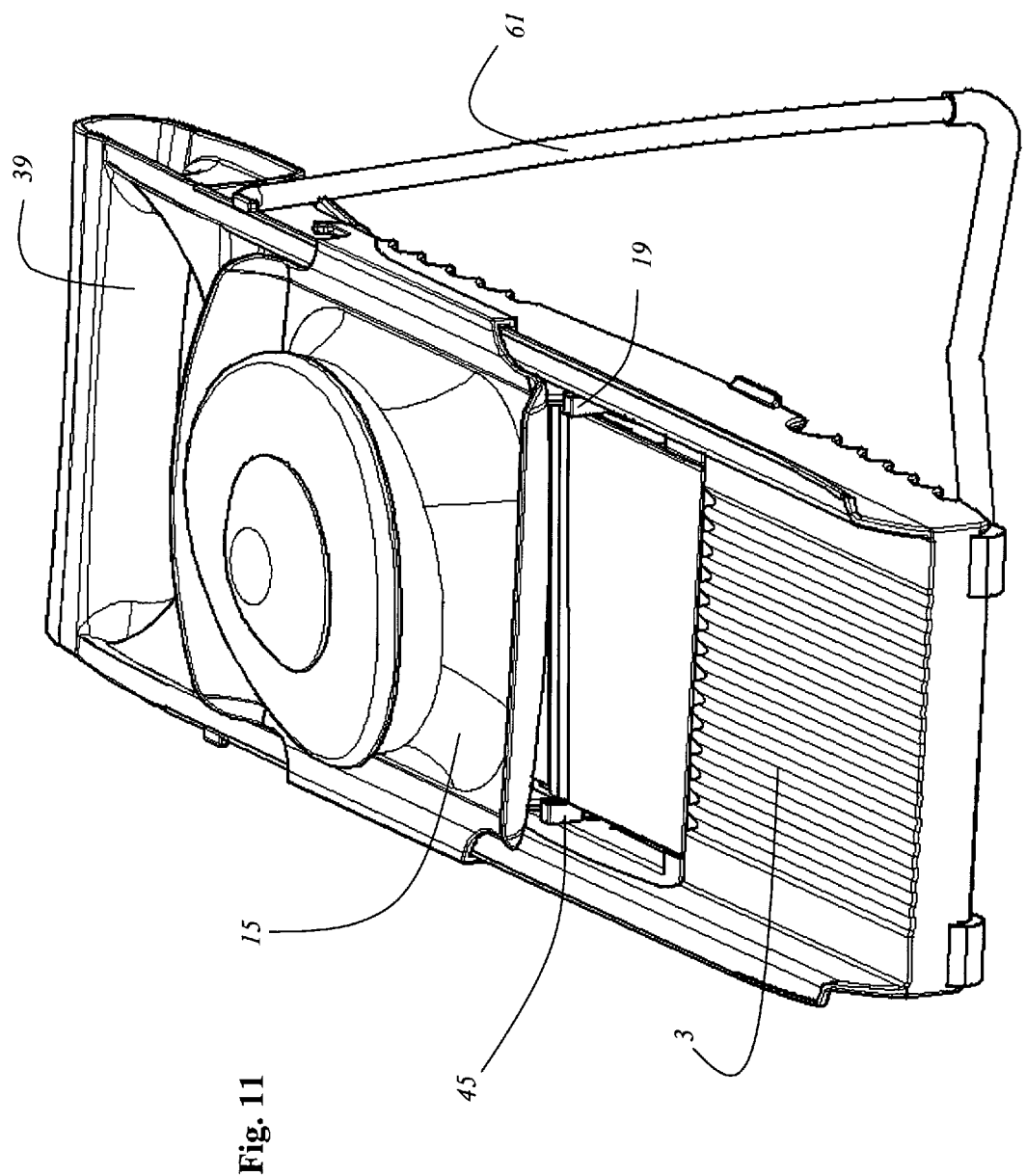

FIG. 11 shows a perspective view of the device 1 for mincing food that was already described with reference to FIG. 6. The device has a stand 61 so that it can be securely set upright.

The invention has been described with reference to particular embodiments. However, it goes without saying that changes and modifications can be made without departing from the protective scope of the claims below.

LIST OF REFERENCE NUMERALS 1 device for mincing food
3 slide
5 food product to be minced
7 cutting blade
9 cutting edge
11 switch-over means
13 baseplate
15 holder
17 pusher
19 switch-over lever
21 rotational axis
23 cam
25 hinge
27 rail
29 guide elements
31 rotational shaft
33 feed lip
35 angled lever
37 support
39 handle
41 ridges
43 blade module
45 switch-over lever
47 V-shaped blade
49 slide connection element
51 slide connection element
53 adjustment lever
55 contact slope
57 additional blade module
59 elongated blade
61 stand

The invention claimed is:

1. A device for cutting food comprising:
a cutting blade including a cutting edge;
a slide operable to receive a food product that is slid across the slide in a first sliding direction so as to cut the food product while the food product is sliding in the first sliding direction using the cutting edge;
a switch including a switch-over lever operable by at least one of the food product and a holder configured to receive the food product to switch the device from a neutral position in which the cutting edge is substantially disposed in a plane of the slide and at least one of covered and recessed, to a cutting position in which the cutting edge is raised with respect to a surface of the slide and neither covered nor recessed; and
a spring coupled to the switch, the spring configured to release the switch and automatically switch the cutting blade back to the neutral position as the food product is slid in the first sliding direction.

2. The device recited in claim 1 wherein the switch is configured to switch the device from the neutral position to the cutting position when the food product comes within a predefined distance of the cutting blade.

3. The device recited in claim 1 wherein the switch is configured to switch the device from the neutral position to the cutting position when the food product reaches a predefined position on the slide.

4. The device recited in claim 1 wherein the switch is configured to switch from the cutting position to the neutral position when the food product goes beyond a predefined distance from the cutting blade.

5. The device recited in claim 1 wherein the switch is configured to switch from the cutting position to the neutral position when the food product reaches a predefined position on the slide.

6. The device recited in claim 1 wherein the switch is configured to switch as a function of a direction of movement of the food product on the slide.

7. The device recited in claim 1 wherein the cutting blade is arranged movably relative to the slide.

8. The device recited in claim 1 wherein the slide is arranged on a baseplate, and
wherein when the device is in the neutral position the cutting edge is at least one of covered by the baseplate or recessed into the baseplate.

9. The device recited in claim 1 wherein the switch is configured to move a feed lip so as to switch the device from the neutral position to the cutting position.

10. The device recited in claim 1 wherein a height between the cutting edge of the cutting blade and the slide is adjustable so as to adjust a cutting thickness.

11. The device recited in claim 1 wherein, in the cutting position of the device, the cutting edge of the cutting blade is disposed at an angle from the plane of the slide.

12. The device recited in claim 1 wherein the cutting blade is part of a blade module.

13. The device recited in claim 12 wherein the switch is an integral part of the blade module.

14. The device recited in claim 1 wherein, in the cutting position of the device, the cutting edge of the cutting blade is disposed in a plane parallel to a plane of the slide.

15. A device for cutting food comprising:
a slide operable to receive a food product that is slid across the slide in a first sliding direction during which the food product is cut as part of a cutting procedure;
a holder operable to hold the food during the cutting procedure and convey the food onto the slide;
at least one cutting blade configured to cut the food product while the food product is sliding in the first sliding direction, the cutting blade including a cutting edge attached to the slide;
a switch attached to the slide and including a switch-over lever actuable to switch, by movement of the holder in the first sliding direction during the cutting procedure, the cutting edge from a neutral position in which the cutting edge is substantially disposed in a plane of the slide and at least one of covered and recessed, to a cutting position in which the cutting edge is raised with respect to a surface of the slide and neither covered nor recessed; and
a spring coupled to the switch, the spring configured to release the switch and automatically switch the cutting blade back to the neutral position as the food product is slid in the first sliding direction.

16. The device recited in claim 15 wherein the holder includes a rail configured to actuate the switch.

17. The device recited in claim 15 wherein the switch is actuable by the holder when the holder reaches a predetermined position on the slide.

18. The device recited in claim 15 wherein the switch is actuable by a movement of the holder only in the first sliding direction along the slide.

\* \* \* \* \*